Aug. 25, 1970   W. C. JOHNSON   3,525,844
ELECTRIC WELDING BACKING
Filed March 22, 1968   3 Sheets-Sheet 1

INVENTOR.
Wallace C. Johnson
BY
ATTORNEYS

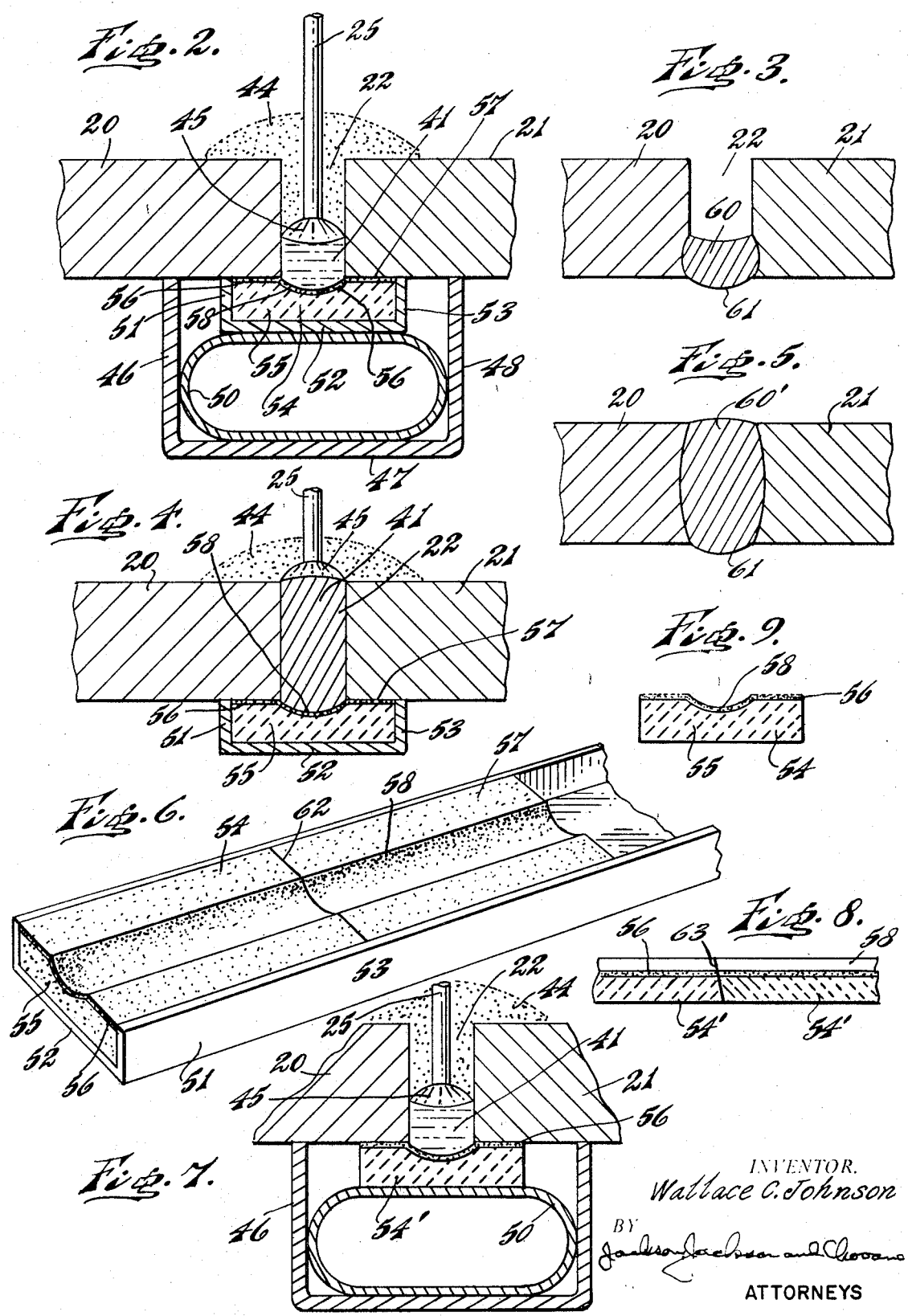

Aug. 25, 1970      W. C. JOHNSON      3,525,844
ELECTRIC WELDING BACKING
Filed March 22, 1968      3 Sheets-Sheet 3

INVENTOR.
Wallace C. Johnson
BY
Johnson, Jackson and Clarence
ATTORNEYS

United States Patent Office 3,525,844
Patented Aug. 25, 1970

3,525,844
ELECTRIC WELDING BACKING
Wallace C. Johnson, St. Davids, Pa., assignor to Arcos Corporation, Philadelphia, Pa., a corporation of Pennsylvania
Filed Mar. 22, 1968, Ser. No. 715,418
Int. Cl. B23k 9/18, 25/00
U.S. Cl. 219—73                                                    18 Claims

ABSTRACT OF THE DISCLOSURE

The disclosure relates to a backing to retain a molten pool in electric welding using iron, nickel, chromium or cobalt base alloys or alloys whose base is any combination thereof, the backing being made of a ceramic preform which has a fluxing coating which will form a parting layer from the weld, made of manganous oxide, ferric oxide, or a mixture of zirconium silicate and wallastonite. Metallic particles will optionally be employed in the weld groove.

DESCRIPTION OF INVENTION

The present invention relates to a process, and apparatus for electric welding and particularly to retention of a molten metal pool by a backing block comprising a ceramic preform.

A purpose of the invention is to close a welding groove and retain a weld pool of molten metal by a ceramic preform which bridges the groove and has a body portion of a ceramic refractory capable of withstanding the welding temperature and a fusible coating in contact with the weld pool of a mixture of zirconium silicate and wollastonite, or manganous oxide, MnO, or ferric oxide, $Fe_2O_3$.

A further purpose is to melt the coating in contact with the weld pools so that it will wet the pool and the solidifying weld to form a smooth weld bead, and form a parting layer, the preform falling away from the solidified weld without the necessity to chip it or brush it.

A further purpose is to close the bottom of a weld groove by the preform in making horizontal welds and close the side or sides of the weld groove by the preform in making vertical welds.

A further purpose is to apply the principles of the invention to submerged arc welding, mig welding, tig welding, squirt welding, electroslag welding or the like. The invention is thus applicable where there is truly an arc as in submerged arc welding or where heating is accomplished without an arc as in electroslag welding. The invention is also applicable whether the electrode is a bar, metallic wire or strip, a flux-coated wire or strip, or a flux-cored wire or strip.

A further purpose is to make the body of the preform or backing block of a ceramic refractory which will withstand the welding temperature, consisting for example of alumina, magnesia, chromite, mullite, zirconium silicate, fireclay, or otherwise, alone or in combination.

A further purpose is to incorporate in the flux coating a thickening agent such as bentonite and a bonding agent such as sodium silicate and bake the preform to eliminate moisture.

A further purpose is to arc in the weld groove to metallic particles grounded to the weld members and adjacent to the ceramic preform backing block so that the metallic particles by melting will absorb heat and protect the backing block.

A further purpose is to make the ceramic preform porous, desirably having a porosity of between 5 and 25% and preferably between 8 to 12% so as to aid in eliminating air or other gases from the weld groove through the preform prior to the time when its surface coating melts to form a glassy layer.

A further purpose is to join a succession of ceramic backing blocks on a metallic bar and preferably contained within a metallic channel and to urge the bar or channel toward the weld members.

A further purpose to is to provide inclined ends of the backing blocks so as to reduce leakage.

Further purposes appear in the specification and in the claims.

In the drawings we have chosen to illustrate one only of the numerous embodiments to which the invention may appear, selecting the forms shown from the standpoints of convenience in illustration, satisfactory operation and clear demonstration of the principles involved.

FIG. 2 is a diagramatic enlarged vertical section of a horizontal welding operation according to the invention in its early stages, the welding being conducted from above by the submerged arc technique.

FIG. 3 is a view similar to FIG. 2, showing the completion of a back bead.

FIG. 4 is a view similar to FIG. 2, showing single pass welding.

FIG. 5 is a view similar to FIG. 4 showing a completed single pass weld.

FIG. 6 is a fragmentary perspective of a backing bar as shown in FIGS. 2 and 4, with ceramic preforms inserted therein.

FIG. 7 is a view similar to FIG. 2, omitting a backing bar.

FIG. 8 is a fragmentary longitudinal section through backing blocks as shown in FIG. 7, or permissibly in FIGS. 1, 2, 4 and 6.

FIG. 9 is a cross section of a backing block of the invention.

Figure 1:
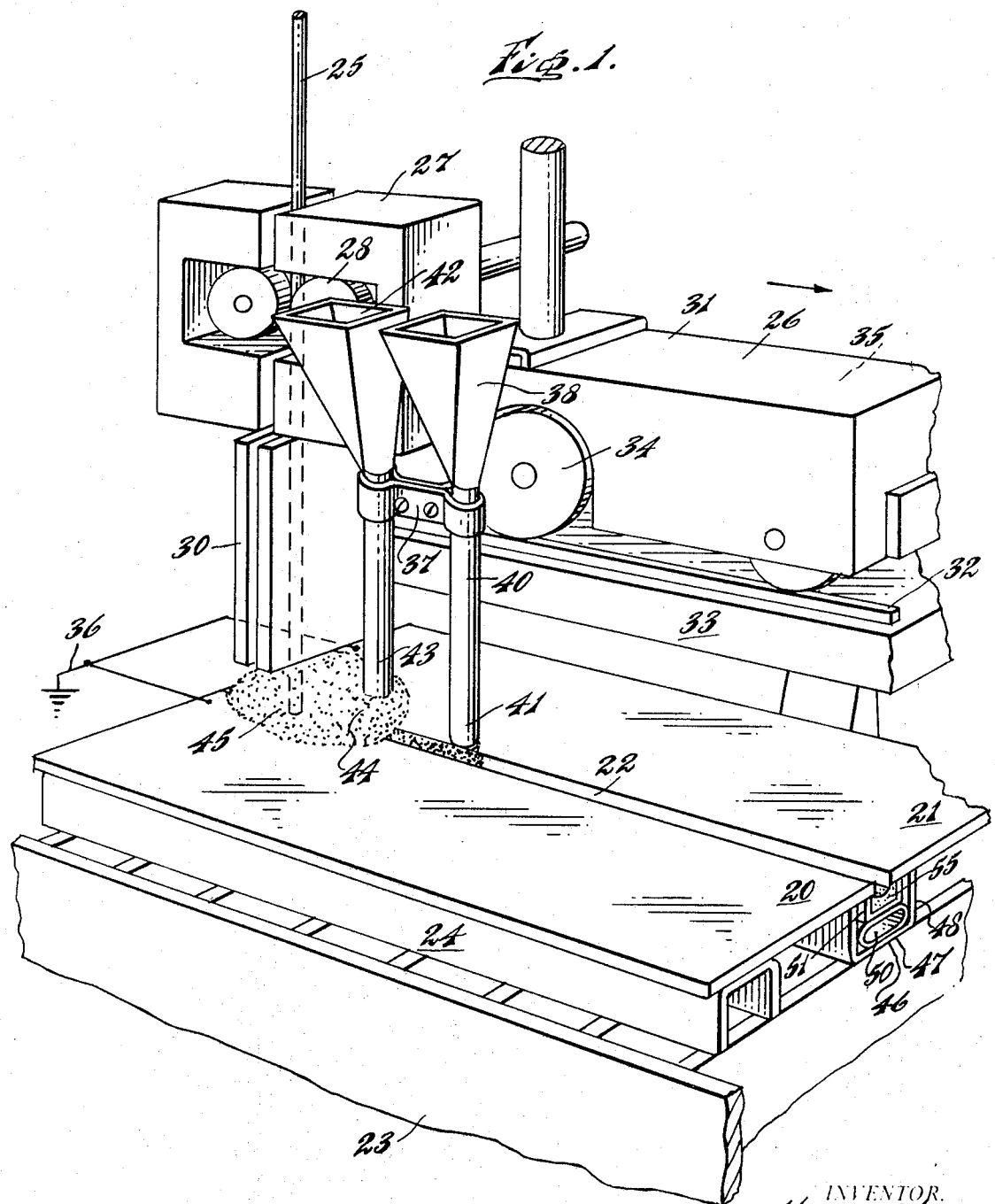
FIG. 1 is a diagrammatic perspective of a welding operation being performed according to the invention.

In the prior art, the problem of providing backing for weld grooves in making welded joints between two or more metallic members, such as plates, sheets, bars or shapes, has presented serious difficulty. This difficulty has existed in making vertical welds, where one or more openings are provided at the sides, but it is particularly acute when making horizontal welds, for example, between plates, where all the welding is desired to be done from above, to avoid having to turn the plates over and weld again from the back side.

The invention is concerned particularly with welding plain carbon and alloy steels and heat resisting and corrosion resisting alloys. The invention also applies to iron, nickel, chromium, and cobalt base alloys and alloys whose base is a combination thereof. Primarily the invention is concerned with ferritic low and high alloys and austenitic high alloys.

It has been the practice in many cases to employ a backing bar or shoe of copper which must often be water cooled to retain molten metal in the welding groove. This has not always been a happy solution of the problem. In some cases the weld pool has picked up excessive copper content, producing welds of unsatisfactory metallurgical properties. Where weld members of considerable length are being welded, for example, in making butt welds of steel plates for ships and the like, it is seldom possible to achieve absolute straightness of the weld members, and it then becomes difficult to make a tight joint between a relatively rigid copper bar and the elongated weld members. In some cases, copper blocks or shoes have been mounted on flexible members such as chains and cables or flat strips, and this has solved some problems, but it would be desirable in many cases to avoid the presence of copper in contact with the weld pool entirely.

Effective use has been made in some cases of backing adhesive tapes, made for example of multiple layers of aluminum foil and fiber glass tape. Where, however, high current inputs are used such as in automatic welding as in arc welds between horizontal or vertical plates, severe limitations are imposed on the use of backing tape.

Success has also been achieved in some applications by using backing troughs filled with loose granular non-metallic backing materials, and pressed into place as for example, by a fire hose under pneumatic pressure acting from a backup bar or abutment. Where, however, the plates are closely abutting, leaving only a narrow weld groove, it is difficult to distribute the granular material on the backing to make a uniform backing surface. Furthermore, in some cases the weld has tended to penetrate the backing, in which case parting from the backing material is not easily accomplished and chipping or brushing on the back side may be necessary.

The present inventor has investigated various compositions for making backings of loose granular material with limited success.

It has been found, however, that great improvements in weld backing can be made by producing backing blocks of ceramic preform, the body of which is composed of refractory material capable of withstanding the welding temperature without melting and the surface adjoining the weld being coated with a material of the character of a mixture of zirconium silicate and wollastonite, or manganous oxide, MnO, or ferric oxide, $Fe_2O_3$, which is capable of providing an effective parting layer at the weld.

The body of the preform may be made of a wide variety of ceramic refractories, such as alumina, magnesia, zirconia, chromite, mullite, zirconium silicate, fireclay or the like, alone or in combination. A preferable preform body is mullite 97%, bentonite 3% by weight, bonded by sodium silicate as set forth. These materials are molded or pressed into blocks, bricks or tiles which are capable of retaining the weld pool without melting. The molding may be accomplished by using any desirable refractory molding technique, such as molding in a brick press, suitably under a pressure of at least 50 p.s.i., extruding, or tamping as under an air hammer.

The body will be bonded by a suitable bonding agent, an example of which is sodium silicate. Where sodium silicate is used as a bonding agent it is desirable to employ N brand which has a molecular ratio of sodium oxide to silica of 1:3.22 or K brand which has a molecular ratio of sodium oxide to silica of 1:2.90. These are preferably used in concentrations of about 30° Baumé, and the quantity of sodium silicate is preferably 1 to 6% on the weight of the dry ingredients. On a wet basis good results have been obtained using 18 lbs. of N brand sodium silicate for 100 pounds of dry ingredients.

Where the backing block is to be extruded, either of the types of sodium silicate mentioned above may be used, desirably in concentrations of 40, 41 or 47° Baumé, as available, the quantity used in the extrusion mixture desirably being 30 pounds of sodium silicate in wet weight per 100 pounds of dry ingredients.

It is preferable to incorporate with the refractory an ingredient which will render it plastic, for example 1 to 4% by weight of bentonite.

The "green" moist backing blocks after molding are heated for example to a temperature of 500° F. to 800° F. for a time of at least one hour, suitably in a brick kiln or furnace to dry out the moisture.

In the preferred embodiment, the ceramic preforms should have a porosity of the order of 5 to 25% by volume and preferably of 8 to 12% so as to prevent penetration of molten metal but to permit air to pass through to avoid causing gas cavities prior to the formation of a glaze on the surface. It is preferred, therefore, to screen the refractory so that the particles used are between 20 and 200 mesh per linear inch (Tyler standard), eliminating particles which are through 200 mesh as far as commercially convenient.

Unfortunately, the refractory above referred to for making the body of the backing block has the undesirable effect of adhering or clinging to the surface of the weld without wetting it. Accordingly, the backing block in many cases must be forcibly separated from the solidified weld, and the surface of the weld must be subjected to some finishing treatment as for example chipping or brushing.

It has been found, however, in the present invention that self-parting properties can be imparted to the backing blocks which will produce very attractive and smooth welds on the reverse face, by coating the backing blocks with a fluxing agent which will melt and create a parting layer.

One effective coating which will produce a smooth weld surface and part clearly from the weld when it is solidified is composed of 50 to 90% of zirconium silicate and 10 to 50% of wollastonite, by weight. The preferred composition is about 75% zirconium silicate and about 25% of wollastonite by weight. It is preferable to include 1 to 5% of bentonite as a plasticizing agent, preferably about 2% and to bond with sodium silicate as above described.

A desirable composition for the surface coating is 75% by weight of zirconium silicate, 23% of wollastonite and 2% of bentonite by weight, plus sodium silicate as above mentioned. For best results the zirconium silicate is coarse, for example between 10 and 50 mesh, and the wollastonite is fine, say 50 to 150 mesh. Mesh, when referred to herein, are Tyler standard mesh per linear inch.

Instead of the mixture of zirconium silicate and wollastonite, the coating on the surface of the backing block which engages the weld may be of manganous oxide, MnO, or ferric oxide, $Fe_2O_3$, or mixtures thereof. Manganous oxide colors the block brown and ferric oxide produces a black surface thereon. The weld surface is a metallic blue in each case.

The fluxing layer is suitably deposited as a paint, for example by embodying the oxide particles in a water slurry suitably with a thickening agent such as 1 to 6% by weight of bentonite, with or without a binder such as sodium silicate as described. After applying the paint, the backing block is dried at a suitable temperature, preferably 500° F. for one hour or more.

The fluxing layer has the property of melting under the heat of molten metal, steel or the like, which is being welded, of wetting the molten weld metal, and of forming a parting layer which will drop off when the weld has solidified. It has the proper relation of density to that of a steel or heat- or corrosion-resisting weld pool, so that it will not float to the top, but will remain at the bottom or side of the weld pool. A good smooth, metallic surface results and this is not obtained when the weld pool is directly in contact with the highly refractory ceramic materials above referred to.

It is preferable to provide a groove in the preform to for a slight rib or bead at the back side of the weld, and the oxide coating layer of course extends over the surface of the groove.

It is decidedly preferable to limit the exposure of the backing block to superheated weld metal by incorporating in the weld groove loose metallic particles which will absorb substantial heat in melting, and to which the arc can partially or wholly extend from the electrode.

The backing blocks obtained by the present invention may conveniently be of the character of bricks or tiles. Since it is necessary to position them so as to permit filling a welding groove such as by bridging the groove at the bottom of a horizontal weld, or at the sides of a vertical weld, it is very desirable to place the ceramic backing blocks on a bar, preferably a channel which can contain the blocks. They thus can be aligned end to end and the bar, suitably of flexible material such as steel of light gauge, can be brought into engagement with the weld members to bridge the weld groove as by pneumatic pressure applied through a fire hose or the like. The backing blocks can be made to engage with an inclined end joint to cut down metal leakage. The dimensions of the backing blocks will, of course, depend on the size of the weld groove, but for small grooves, they can be conveniently made about 1½ to 2¼ inches wide by ¼ to ½ inch thick and of the order of 6 to 12 inches long.

It is believed that the invention will find wide application in closing bottom welding grooves in generally horizontal welding of plates where all welding is done from above, and either the first weld bead contacts the backing block, or the single weld bead is in contact with it. In this case it is believed to be preferable to deposit metallic powders in the weld groove, the thickness of the metallic powder deposit depending on whether it is to contribute to a backing bead only, or is to form part of the single bead which will complete the weld. The presence of these metallic powders is definitely beneficial in protecting against penetration of the backing block, which may impair the quality of the surface of the bead at the bottom. Normally it is believed that advantages will exist in employing submerged arc welding in this case, and thus applying flux on top of the metallic powder.

The character of the electrode employed will, of course, depend upon whether automatic, semiautomatic or manual welding is employed, and also on the welding technique. For automatic or semiautomatic welding in many cases, bare electrode wire or strip will be used, but in some cases flux cored electrode may be employed. With manual welding, the electrode will normally be flux coated or flux cored. It will be understood, of course, that combinations of flux and protective gas or protective gas alone may be used, particularly in welding of ferrous metals of the type normally welded with protective gases such as the inert gases. In the case of steel, inert protective gases or carbon dioxide may be used as a protective atmosphere.

Besides submerged arc welding, the principles of the invention may be applied with mig, tig or squirt welding.

The invention also has application in electroslag welding, which will best be employed on vertical joints, with the backing blocks closing side openings. In this case the invention offers the advantage of avoiding contamination which might occur from copper shoes and improving heat efficiency because water cooling is not required.

It will be evident that in starting an arc using the present invention, where metallic particles are not employed in the weld groove, the arc can be started by arcing to the side or other surface of metallic weld members, or by introducing metallic wool or the like.

As shown in FIG. 1, plates 20 and 21 are in spaced relation providing an intermediate gap 22 in which a welded joint is to be made. The plates are supported horizontally on a bed 23 having a longitudinally extending horizontal supporting top portion 24.

An electrode 25, suitably a bare wire of proper alloy composition, which will normally be of plain carbon or alloy steel in the case of welding steel plates, is progressed downward to the weld groove 22 by a suitably automatic or semiautomatic welding machine 26 having an electrode feed motor 27 and feeding rollers 28. Beneath the feed rollers 28 are resiliently urged electric contact shoes 30 which make electric contact to the electrode. The electrode feed mechanism is mounted on a carriage 31 which advances along rails 32 (only one is shown) positioned on a support 33, the carriage having grooved wheels 34 which engage the track, wheels 34 being driven by a welding machine advance motor drive 35. The plates 20 and 21 being welded are grounded by suitable electrical leads 36.

The electrode is suitable fed to the electrode feed from a reel (not shown) carried by the welding machine.

The carriage has mounted thereon a bracket 37 which supports a first hopper 38 having a feed tube 40 extending downward to just above the weld groove 22 and discharging metallic particles 41 which are adapted to occupy a portion or all of the weld groove as desired. Positioned behind the hopper 38 for metallic particles, there is a hopper 42 mounted on the bracket 37 which has a discharge tube 43 which deposits flux 44 for submerged arc welding operation in this case, the flux being spread over the metallic particles high enough to submerge the arc 45.

In FIG. 2 it is possible to observe more closely the backing of the weld groove. Extending beneath the plates, and suitably supported, is a channel 46 having a bottom 47 and sides 48, the open portion being upwardly directed so that the sides engage the bottoms of the metallic plates 20 and 21 which are being welded. In the channel is provided a pneumatic pressure member suitably a fire hose 50 which can conveniently be closed at one end and inflated with compressed air. The fire hose supports an upwardly open longitudinally extending metallic bar 51 preferably in the form of a channel and desirably made of light enough gauge steel or the like so that it will readily flex to conform to any discontinuity or lack of straightness of the plates. The channel 51 has a bottom portion 52 and arms 53 which extend upwardly and engage the bottoms of the plates 20 and 21. Backing blocks 54 of ceramic preform extend through the channel 51 gripped by its sides. The backing blocks are preferably inserted in the channel after they have been formed, the sides of the channel being slightly sprung to grip the backing blocks. Each of the backing blocks in the preferred form comprises a ceramic refractory body portion 55, made of one of the ceramic refractories as above referred to, for example, alumina, magnesia, chromite, zirconia, zirconium silicate, mullite, fireclay, or the like, bonded for example by sodium silicate, as above described, and desirably containing bentonite, as above described. Very good results have been obtained using 97% mullite, 3% bentonite by weight, bonded by sodium silicate as set forth.

After molding, for example in a brick press, or extrusion, or ramming, the refractory is dried, for example at 500° F. for a time of at least two hours. Then in the preferred embodiment the surface which is to engage the weld is coated with a fluxing coating 56, suitably of a mixture of zirconium silicate and wollastonite as above described, or manganous oxide or ferric oxide, desirably in a water slurry and suitably containing sodium silicate and bentonite, as above described. One or more layers of ceramic coating are applied and then the backing blocks are dried as by heating to 500° F. for a time of at least one hour.

The backing blocks in the preferred embodiment have flat surfaces at 57 which engage cooperating surfaces of each of the plates and form a bridging member across the weld groove 22 and in between this flat surface 57 and suitably opposite the weld groove the backing blocks desirably have grooves 58 which are capable of forming a symmetrical bulge corresponding to a weld bead. Thus, in FIG. 2 the electrode 25 is forming a submerged arc 45 to a filling of metallic particles 41 in the bottom of the weld groove 22 and held at the bottom by the groove or recess 58 in the backing block, the metallic particles being in electrical contact with the grounded plates 21 and 22.

At the beginning of the welding operation at any location along the groove the backing block is porous enough to allow gas to escape through its porosity ahead of the weld. At the point of welding the fusible ceramic coating 56 melts and forms a glaze which wets the bottom of the weld pool, forming a smooth and attractive weld bead, and after the weld solidifies and the channel 46 and fire hose 50 are removed, the backing blocks drop away from the weld bead, without the need to chip or brush it and without the need to crack the backing blocks off with a hammer or otherwise.

Accordingly, as shown in FIG. 3, after removal of the slag above, there is a bottom weld bead 60 formed that has a uniform well defined bottom surface 61, while conducting all welding from above.

In some cases as in FIG. 4 it may be intended to conduct all welding in one pass. In this instance sufficient metallic particles 41 will be introduced suitably to fill the entire weld groove 22. Welding will be conducted as before, it being understood that in FIG. 4 the showing of the channel 46 and the fire hose 50 are eliminated for convenience in illustration. As a consequence, a weld bead 60' has formed, as shown in FIG. 5, which has the desired bead surface on the bottom defined by the ceramic backing blocks.

FIG. 6 illustrates the placement of a succession of backing blocks end to end in the channel 51, the dimensions of the backing blocks being such that they tend to spread the arms of the channel and are then held in by the spring of the channel sides, suitably abutting to form end joints 62.

In some cases it may be preferred to apply the backing blocks 54 in succession without using any bar, or channel 51. This is shown in FIG. 7 where the pneumatic member (fire hose) 50 acts directly against a backing block 54', no bar or channel 51 being employed. In this case and for example other forms if desired, it may be desirable to assure endwise positioning of backing blocks so that they will not become displaced. As shown in FIG. 8, the ends of the backing blocks are inclined at 63 to form a joint which is not at right angles to the top, so as to cut down leakage.

Figure 10:
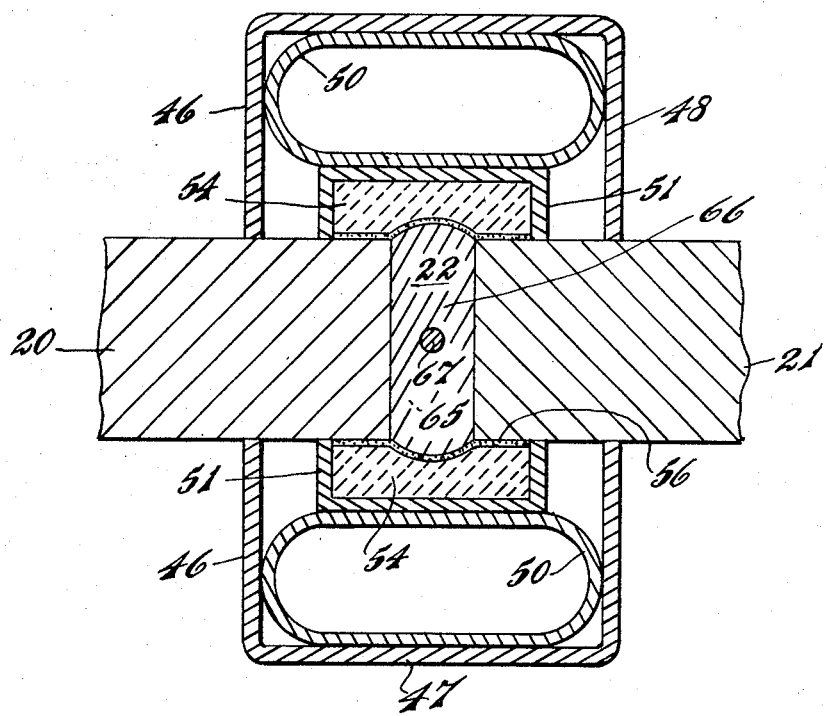
FIG. 10 is a diagrammatic horizontal section of a vertical weld by the electroslag process according to the invention.

It will be evident that the principles of the invention can be applied to define lateral openings in a weld groove as in vertical welding, for example under the electroslag process. In FIG. 10 bars or channels 51 having a line of backing blocks 54 have been provided to bridge the weld groove 22 at both sides, the backing blocks being pressed against the metallic weld members 21 and 22 by the same technique shown in FIG. 2, using a pneumatic device 50 and a channel 46.

In the weld groove 22 there is on top of the solidified weld bead a molten metal weld pool 65 and on top of this molten slag 66 in which the electrode 67 is inserted from above. As the weld advances it moves upward and as required additional backing blocks and bars or channels 51 are added to maintain the integrity of the weld groove against lateral leakage. Thus it is possible by FIG. 10 to produce vertical welds without contamination from copper shoes.

It will be evident that according to the present invention the ceramic refractory particles and also the fusible coating particles and the preformed metallic particles are all rigidly fixed as by molding, tamping, or extrusion, so that the likelihood that they will become misplaced and require smoothing out or levelling off is avoided. Accordingly, backing blocks can under some conditions be re-used, either directly or preferably by applying another layer of fusible ceramic coating surface to adjoin the weld and suitably drying to remove moisture.

EXAMPLE 1

Steel plates ½ inch thick of steel analysis AISI 1020 are welded horizontally in a single pass from above. The edges of the plates at the joint prior to welding are square, and there is no bevel. A groove between the said edges is provided. Allowing for lack of straightness of the said edges, the groove is between 3/15 and 3/8 inch in width.

Beneath the groove is placed a series of preformed ceramic refractory blocks having a rounded groove in their upper surface, the groove being of 1 inch in radius, and the width of the chord being ¾ inch across the top. The composition of the refractory used in making the blocks is 97% mullite and 3% bentonite by weight. The mixture is moistened with 40° Baumé N brand sodium silicate, in a quantity of 46 cc. to one pound of the dry ingredients. After having been thoroughly mixed with the dry ingredients, the ceramic refractory mix is placed in a die and pressed at a pressure of 28,000 pounds over the flat horizontal surface. After molding, each block is removed from the die and dried slowly in air and finally baked for two hours at a temperature between 600 and 800° F. The ends are then sawed to make inclined or beveled ends having an angle between 20 and 30°.

The surfaces of the ceramic refractory preforms are then painted in the groove with a thick coating of manganous oxide mixed with 3% bentonite, suspended in 30° Baumé N brand sodium silicate, using in the ratio of 250 grams of 30° N brand sodium silicate on a wet basis to 315 grams of dry powders. After painting, the ceramic refractory preforms are baked at 300° F. for one hour.

The weld groove is filled almost to the top with metallic particles consisting of 97% powdered iron and 3% ferromanganese by weight. As an alternate for the ferromanganese, electrolytic manganese can be used, or a mixture of 1% electrolytic manganese, 2% ferrosilicon and 1% aluminum powder by weight. If necessary, the metallic powders can be tamped so that they fill the groove against the preforms without voids, not quite flush, so that the welder can follow the groove in controlling the welding machine.

Over the top of the weld groove as the submerged arc welding machine progresses, a layer of submerged arc flux consisting of manganese silicate (Lincoln 780) is deposited. The electrode wire is 3/16 inch in diameter, bare wire of steel AISI 1025. The welding current used is 800 amperes at a voltage of 34 to 35 volts, and the speed of progression is 12 inches per minute.

Sound welds are obtained with a weld bead on the bottom conforming to the groove in the backing blocks, and the backing blocks part effectively from the weld without chipping or brushing being required on the bottom of the weld.

EXAMPLE 2

The procedure of Example 1 is followed, except that after molding each backing block and before drying, it is painted with the manganous oxide, and then the backing blocks are each dried slowly in air and then baked for two hours at 600 to 800° F. The results are the same as those obtained in Example 1.

EXAMPLE 3

The procedure of Example 1 is followed except that the manganous oxide is sprayed on each backing block after molding and before drying. The results obtained are the same as those in Example 1.

EXAMPLE 4

The procedure of Example 1 is carried out except that instead of manganous oxide, ferric oxide is used. The results are similar to those of Example 1 except that the surface of the bottom of the weld is black and is not as attractive.

EXAMPLE 5

The procedure of Example 1 is carried out except that the coating applied in the groove adjoining the weld is zirconium silicate 75%, wollastonite 23% and bentonite 2% by weight. The results are similar to Example 1.

In view of my invention and disclosure, variations and modifications to meet individual whim or particular need will doubtless become evident to others skilled in the art to obtain all or part of the benefits of my invention without copying the process and product shown, and I, therefore, claim all such insofar as they fall within the reasonable spirit and scope of our claims.

Having thus described our invention what we claim as new and desire to secure by Letters Patent is:

1. A process of electric welding of metallic members of the first class consisting of iron, nickel, chromium, and cobalt base alloys and alloys whose base is a combination thereof, to form a joint, which comprises bringing the metallic members into adjoining spaced relation to form a weld groove, introducing an electrode of said first class into the weld groove, passing electric current between the electrode and the metallic members to melt metal including metal from the electrode to form a weld pool in the weld groove, confining the weld pool against leakage out of the weld groove by bringing into bridging contact with the metallic members a ceramic refractory preform having the particles rigidly related to one another, and maintaining on the surface of the preform adjoining the weld pool a coating of the second class consisting of a mixture of zirconium silicate and wollastonite, manganous oxide, and ferric oxide, the material of the second class defining a parting layer between the preform and the weld.

2. A process of claim 1, in which the coating of the second class consists of 50 to 90% of zirconium silicate and 10 to 50% of wollastonite by weight.

3. A process of claim 1, in which the coating of the second class consists of about 75% of zirconium silicate and about 25% of wollastonite by weight.

4. A process of claim 1, in which the preform is porous to permit escape of air.

5. A process of claim 1, which further comprises at least partially filling the weld groove with metallic particles and arcing from the electrode to the metallic particles to melt them, the metallic particles by melting absorbing heat and protecting against penetration of the weld into the preform.

6. A process of claim 1, in which the metallic members extend horizontally and the ceramic preform closes the bottom of the weld groove.

7. A process of claim 1, in which the metallic members extend vertically, and the ceramic preform closes the side of the weld groove.

8. A backing block for electric welding comprising a ceramic preform having spaced flat areas adapted to engage members to be welded, comprising a ceramic refractory body having a melting point in excess of the welding temperature and a coating on the surface thereof adapted to contact the weld, said coating essentially consisting of a material of the class consisting of a mixture of zirconium silicate and wollastonite; manganous oxide; and ferric oxide.

9. A backing block of claim 8, in which the coating of the class consists of 50 to 90% of zirconium silicate and 10 to 50% of wollastonite by weight.

10. A backing block of claim 8, in which the coating of the class consists of about 75% of zirconium silicate and about 25% of wollastonite by weight.

11. A backing block of claim 8, in which the preform consists of 97% mullite, 3% bentonite by weight.

12. A backing block of claim 8, in which the ceramic preform is porous to permit the escape of air.

13. A backing block of claim 8, having sloping ends for reduction of leakage.

14. A backing assembly for electric welding comprising a longitudinally extending metallic bar and a series of backing blocks secured to the bar, each of the backing blocks being composed of preform ceramic refractory particles having a melting point in excess of the welding temperature and a coating on the surface thereof adjoining the weld, said coating essentially consisting of a material of the class consisting of zirconium silicate and wollastonite; manganous oxide and ferric oxide.

15. A backing assembly of claim 14, in which the material of the class consists of 50 to 90% of zirconium silicate and 10 to 50% of wollastonite by weight.

16. A backing assembly of claim 14, in which the bar consists of a channel extending along at least part of three sides of the backing blocks and containing them.

17. A weld mechanism adapted to form a weld between spaced metallic weld members having a weld groove, metallic particles occupying the groove, an electrode in arcing relation to the metallic particles, means for impressing an electric current between the electrode on the one hand and the metallic particles grounded to the weld members on the other hand, and a backing block closing the weld groove, bridging between the metallic members and comprising a preform of ceramic refractory resistant to the welding temperature and a coating on the surface of the preform adjoining the weld, essentially consisting of a material of the class consisting of a mixture of zirconium silicate and wollastonite; manganous oxide and ferric oxide.

18. A weld mechanism of claim 17, in which the material of the class consists of 50 to 90% of zirconium silicate, and 10 to 50% of wollastonite by weight.

References Cited

UNITED STATES PATENTS

| | | | |
|---|---|---|---|
| 2,331,937 | 10/1943 | Schreiner | 219—160 |
| 2,365,226 | 12/1944 | Stout | 219—160 |
| 2,796,843 | 6/1957 | Kleppinger | 219—160 |
| 2,847,958 | 8/1958 | Norton et al. | 219—160 |
| 2,945,937 | 7/1960 | Tinsley et al. | 219—160 |
| 3,192,357 | 6/1965 | Duffey et al. | 219—160 |
| 3,221,135 | 11/1965 | Maier | 219—73 |
| 3,372,852 | 3/1968 | Cornell | 219—160 |

WILLIAM D. BROOKS, Primary Examiner

U.S. Cl. X.R.

219—160